(12) United States Patent
Matysik et al.

(10) Patent No.: US 11,991,371 B2
(45) Date of Patent: May 21, 2024

(54) IMAGE PROCESSING SYSTEM FOR REGION-OF-INTEREST-BASED VIDEO COMPRESSION

(71) Applicant: SYNAPTICS INCORPORATED, San Jose, CA (US)

(72) Inventors: Sebastian Matysik, Ruda Slaska (PL); Peter Burgers, Cambridge (GB)

(73) Assignee: Synaptics Incorporated, San Jose, CA (US)

( * ) Notice: Subject to any disclaimer, the term of this patent is extended or adjusted under 35 U.S.C. 154(b) by 16 days.

(21) Appl. No.: 17/356,274

(22) Filed: Jun. 23, 2021

(65) Prior Publication Data
US 2022/0417533 A1    Dec. 29, 2022

(51) Int. Cl.
*G06K 9/46* (2006.01)
*G06T 9/00* (2006.01)
(Continued)

(52) U.S. Cl.
CPC ........... *H04N 19/167* (2014.11); *G06V 10/25* (2022.01); *G06V 40/161* (2022.01); *G06V 40/172* (2022.01); *H04N 7/183* (2013.01)

(58) Field of Classification Search
CPC ...... H04N 19/167; H04N 19/10–19/99; G06V 10/25; G06V 40/16–40/179; G06V 20/53; G06T 2207/30201

See application file for complete search history.

(56) References Cited

U.S. PATENT DOCUMENTS

| | | | | |
|---|---|---|---|---|
| 5,852,669 | A  * | 12/1998 | Eleftheriadis | H04N 19/85 382/250 |
| 6,195,503 | B1 * | 2/2001  | Ikedo         | H04N 1/2112 386/338 |

(Continued)

OTHER PUBLICATIONS

Wang, "Wavelet Transforms and JPEG2000", Yao Wang, Polytechnic University, Brooklyn, NY 11201, Based on Gonzalez/Woods, Digital Image Processing, 2ed A. Skodras, C. Christopoulos, T. Ebrahimi, The JPEG2000 Still Image Compression Standard, IEEE Signal Processing Magazine, Sep. 2001. pp. 1-42. (Year: 2001).*

*Primary Examiner* — Brian Werner
(74) *Attorney, Agent, or Firm* — Paradice & Li LLP

(57) ABSTRACT

An apparatus for remote processing of raw image data receives the raw image data from a camera, such as a security camera. The apparatus includes a detection module to detect portions of the image data that contain possible regions of interest. Information indicating the portions that contain the possible regions of interest is then used during a compression process so that the portions that contain the possible regions of interest are compressed using one or more compression algorithms to facilitate further analysis and the remainder are treated differently. The compressed image data is then transmitted to a central system for decompression and further analysis. In some cases, the detection system may detect possible regions of interest which appear to be faces, but without performing full facial recognition. These parts of the image data are then compressed in such a way as to maintain as much facial detail as possible, so as to facilitate the facial recognition when it is carried out at the central server. The detection may be performed on the raw image data or may be performed as part of the compression process after a transformation of the raw image data has been carried out.

20 Claims, 4 Drawing Sheets

(51) Int. Cl.
*G06V 10/25* (2022.01)
*G06V 40/16* (2022.01)
*H04N 19/167* (2014.01)
*H04N 7/18* (2006.01)

(56) References Cited

U.S. PATENT DOCUMENTS

| | | | | |
|---|---|---|---|---|
| 6,219,640 | B1* | 4/2001 | Basu | G06V 10/811 |
| | | | | 704/231 |
| 2004/0252903 | A1* | 12/2004 | Chen | H04N 19/17 |
| | | | | 375/E7.176 |
| 2016/0007026 | A1* | 1/2016 | Dong | G06V 40/168 |
| | | | | 375/240.08 |
| 2019/0095705 | A1* | 3/2019 | Yu | G06F 18/2135 |

\* cited by examiner

IMAGE PROCESSING SYSTEM FOR REGION-OF-INTEREST-BASED VIDEO COMPRESSION

BACKGROUND

Remote cameras, such as security cameras, for example CCTV cameras, usually output a raw (unprocessed) image, which may form part of a video. This is then compressed locally by a compression device for transmission to a central processing system, such as a central server, where it is decompressed and analysed, for example for facial recognition, or other purposes. Problems can arise due to the compression and decompression of the image, which may cause distortions in the decompressed image, leading to difficulties in the analysis. For example, if a part of the image that contains a face is distorted, for example due to blockiness or other artefacts of the compression/decompression process, facial recognition may not be possible, or may be inaccurate.

Furthermore, distortions may cause a part of the image that is not a face to appear as though it may be a face and therefore cause facial recognition analysis to be performed. In order to reduce these problems, it has been proposed to perform the full analysis of the image at the remote device prior to compression and transmission to the central server. However, this requires the remote device to have significant computing capability, which may be particularly expensive when a large number of cameras and remote devices are used.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An apparatus for remote processing of raw image data may be co-located with a source of the raw image. The apparatus comprises a detection module to detect portions of the image data that contain possible regions of interest. Information indicating the portions that contain the possible regions of interest may then be used during the compression process so that the portions that contain the possible regions of interest are compressed using one or more compression algorithms to facilitate further analysis and the remainder are treated differently. For example, the remainder could be discarded altogether, or could be more highly compressed or use different compression algorithms than the parts containing the possible regions of interest. The compressed image data is then transmitted to a central system for decompression and further analysis.

In some cases, the detection process may detect possible regions of interest which appear to be faces, but without performing full facial recognition. These parts of the image data are then compressed in such a way as to maintain as much facial detail as possible, so as to facilitate the facial recognition when it is carried out at the central server.

The detection process may be performed on the raw image data or may be performed as part of the compression process after a transformation of the raw image data has been carried out. For example, if a Haar transform is used, Haar coefficients, which are generated when image data is transformed by the Haar transform, may be used to facilitate the detection of the possible regions of interest. The image data that contains the possible regions of interest may then be treated differently in the compression process from the image data that does not contain the possible regions of interest.

Furthermore, the compression process, or parts of the compression process, to be used may be selected based on the type of image data received from the source or based on the type of image data in the parts that contain the possible regions of interest.

Apparatus aspects may be applied to method aspects and vice versa. The skilled reader will appreciate that apparatus embodiments may be adapted to implement features of method embodiments and that one or more features of any of the embodiments described herein, whether defined in the body of the description or in the claims, may be independently combined with any of the other embodiments described herein.

BRIEF DESCRIPTION OF THE DRAWINGS

The present embodiments are illustrated, by way of example only and are not intended to be limited by the figures of the accompanying drawings, in which.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

Figure 1:
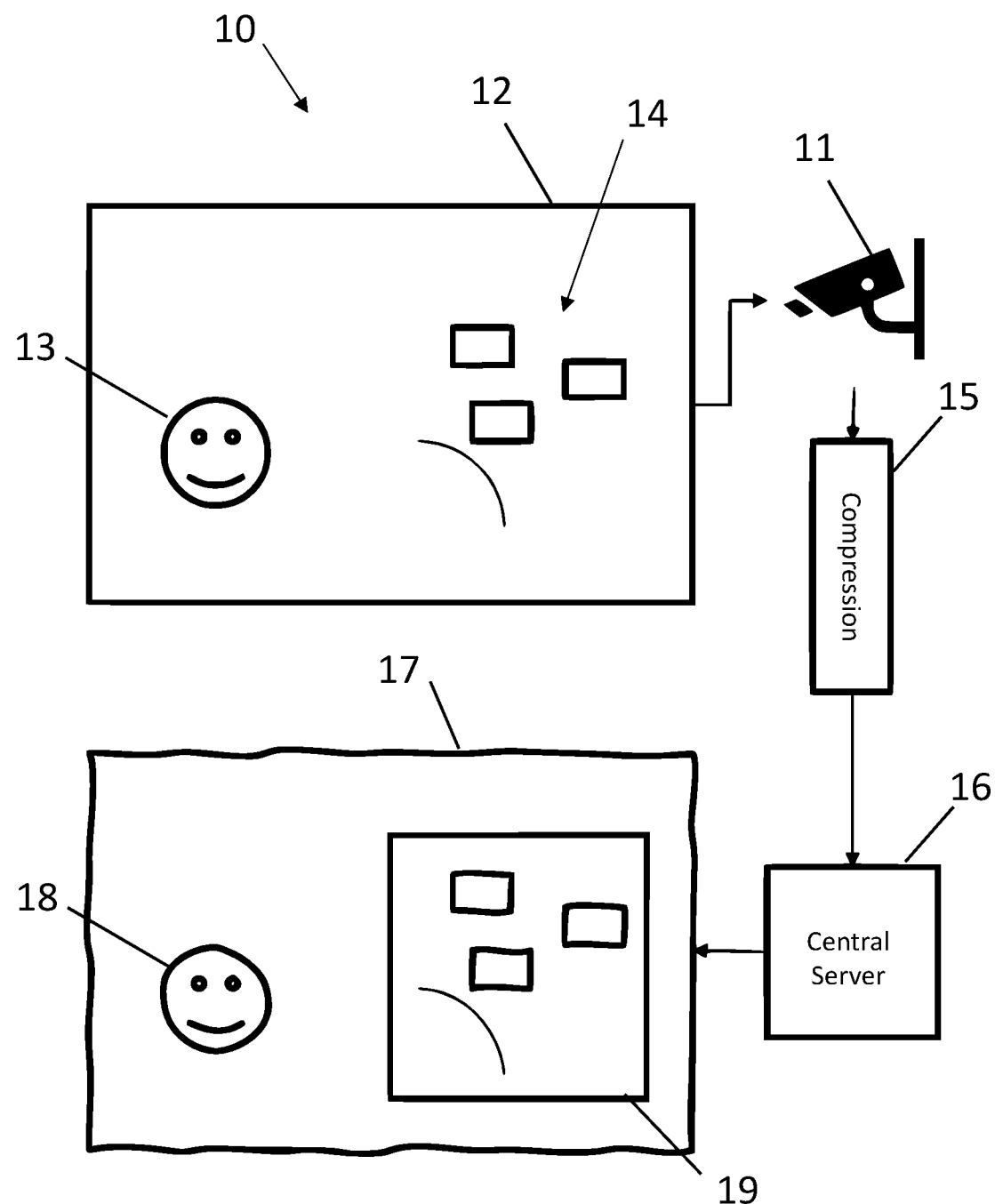
FIG. 1 shows a diagram of a known security system illustrating the potential problems.

FIG. 1 shows a known system 10 and the problem that arises from the current technology. A camera 11 captures a scene 12 which includes a face 13 (which should be recognised) and a collection 14 of random elements which could be perceived as a face (which should not be recognised). The camera 11 may be a security camera, such as a CCTV camera, or a camera in an autonomous vehicle, or a safety monitoring system, or may be part of a smart home or office system. The camera 11 is located at a remote location that is to be monitored for safety, security, or for other purposes. The camera 11 generates raw image data and passes the raw data to a compression device 15, which is usually co-located with the camera 11 at the remote location. The compression device 15 compresses the captured image data and the compressed data is transmitted to a central computer vision system 16, such as a central server, for analysis. The compression generally uses a compression algorithm that compresses all parts of the image data of the scene 12 in the same way.

The computer vision system 16 decompresses the received compressed image data, but due to the compression and decompression process the decompressed image data is often distorted, and may for example, have visual artefacts such as blockiness. An example of distortion is illustrated in the decompressed scene 17 shown in the lower part of FIG. 1 at the central server. As shown, the decompressed scene 17 includes an element 18 that was originally, in scene 12, the face 13, but which has now become distorted, so that the shape of the face is not as easily recognisable such that the face may not be recognised by the computer vision system 16. Furthermore, the distortions have also, as shown as collection 19, made the elements of collection 14 appear more like a face (at least when viewed at an angle in this case), leading the computer vision system 16 to consider that it is a face and erroneously performing facial recognition thereon.

In order to try to improve the correct recognition of elements in the scene by the computer vision system 16, there is now disclosed a first example of a security system according to an embodiment. In this case, the system 20 includes a camera 21, which may be similar to camera 11 of FIG. 1, and a central computing system 26, which may be similar to the computer vision system 16 of FIG. 1.

In this case, however, there is provided a remote processing apparatus 22, which may form part of the camera 21, or be co-located with it at the remote location. The remote processing apparatus 22 includes several modules that perform various functions, which are labelled in FIG. 2 by the function they perform. Thus, there is, firstly, a receiver module 23 for receiving a frame of raw image data from the camera 21, or at least from a source of the image data in the camera 21. The frame of raw image data is passed to both a preliminary detection module 24 and an encoding module 25. The preliminary detection module 24 processes the raw image data to analyze it to determine any portions of the image data that contain possible regions of interest in the frame. The regions of interest will, of course, depend on the circumstances that the system is being used in. For security and safety purposes, regions of interest are likely to be faces for facial recognition, but for autonomous vehicles, regions of interest may be number plates on vehicles, or other warning or safety signs on other vehicles or elsewhere, or may also be faces. As shown in a frame of image data 27, a portion 29 of the frame is detected as potentially containing a face, whereas portion 30 would not be detected as containing a possible region of interest as it does not contain a face.

In alternate version of this process, the preliminary detection may be carried out on raw sensor output from the sensors that make up the camera, before they are processed into a frame of display data. This may be beneficial because the image processing used to form a frame of image data is usually tailored to a human visual system and may discard information that is useful for computer vision. For example, sensor data may include alterations in received light which are outside the dynamic range of the image data and/or at a frequency outside the range of a human eye, which may make it possible to, for example, detect objects in shadow, or to extend the detection into the non-visual parts of the electromagnetic spectrum, such as into the infra-red. This would enable possible regions of interest to be detected based on the infra-red image data, which would otherwise not be used.

For example, the preliminary detection module 24 might identify regions of interest through pixel dynamics and edge detection, since a smooth region is probably not interesting, but the presence of more edges may indicate a possible area of interest.

Information regarding the detected portions of the image data that contain possible regions of interest is passed to a quality policy module 28. The information may contain locations of the portions of image data in the frame, or otherwise provide identifying information to enable the portions to be parsed from the remainder of the image data. The quality policy module determines that the detected portions containing the possible regions of interest should be compressed differently to the remainder of the image data, so that the quality in these detected portions is preserved. The determination is used by the encoding module 25 to compress the detected portions at a first compression level using a first compression process so as to provide a relatively high quality of image data after compression. The compressed image data is then transmitted to the central computing system 26, as before. However, the compressed data now has less distortion of the portions containing possible regions of interest, i.e. portions 29 and 30 containing the face and the objects, so that it is more likely that the face in portion 29 will be recognised by the central computing system 26 and the objects in portion 30 will not be falsely recognized.

The raw image data of the remainder of the frame (or the remainder of the raw image data if not processed into a frame) that does not contain any of the portions of image data containing possible regions of interest may then be compressed by the encoding module 25 at a second compression level using a second compression process. The second compression level may be higher than the first compression level, so that the remainder portions are more highly compressed than the detected portions. Alternatively, the remainder portions may be discarded altogether, so that only the detected portions compressed using the first compression process at the first compression level are then transmitted to the central computing system 26 for further analysis.

In some embodiments, the first compression process (and the second compression process, if used) may be selected from a plurality of possible compression processes that could be used. The selection may be made by the quality policy module 28 as part of the determination that the detected portions containing the possible regions of interest should be compressed differently to the remainder of the image data, so that the quality in these detected portions is preserved. Alternatively, the selection may be made by the encoding module 25 based on an indication from the quality policy module 28.

There may be a number of possible compression processes to select from, and the selection may be based on the type of image data to be compressed (e.g. whether the image data is part of a video, or a single image), or whether it is in grayscale, or black and white or color, or the color depth, or the color space being used, or the frequency range of the image data, or other criteria, or a combination of any of these.

In a more specific example of this, facial detection could be used at the preliminary detection stage and the detected faces could be passed to the computer vision system, which then carries out facial recognition to determine if the detected face is that of a specific individual (or class of individuals such as children). This could then be used in smart home or office systems to allow location of an individual or safety checks such as notifying parents if a toddler is in an unsafe area of the house, such as the stairs.

Figure 2:
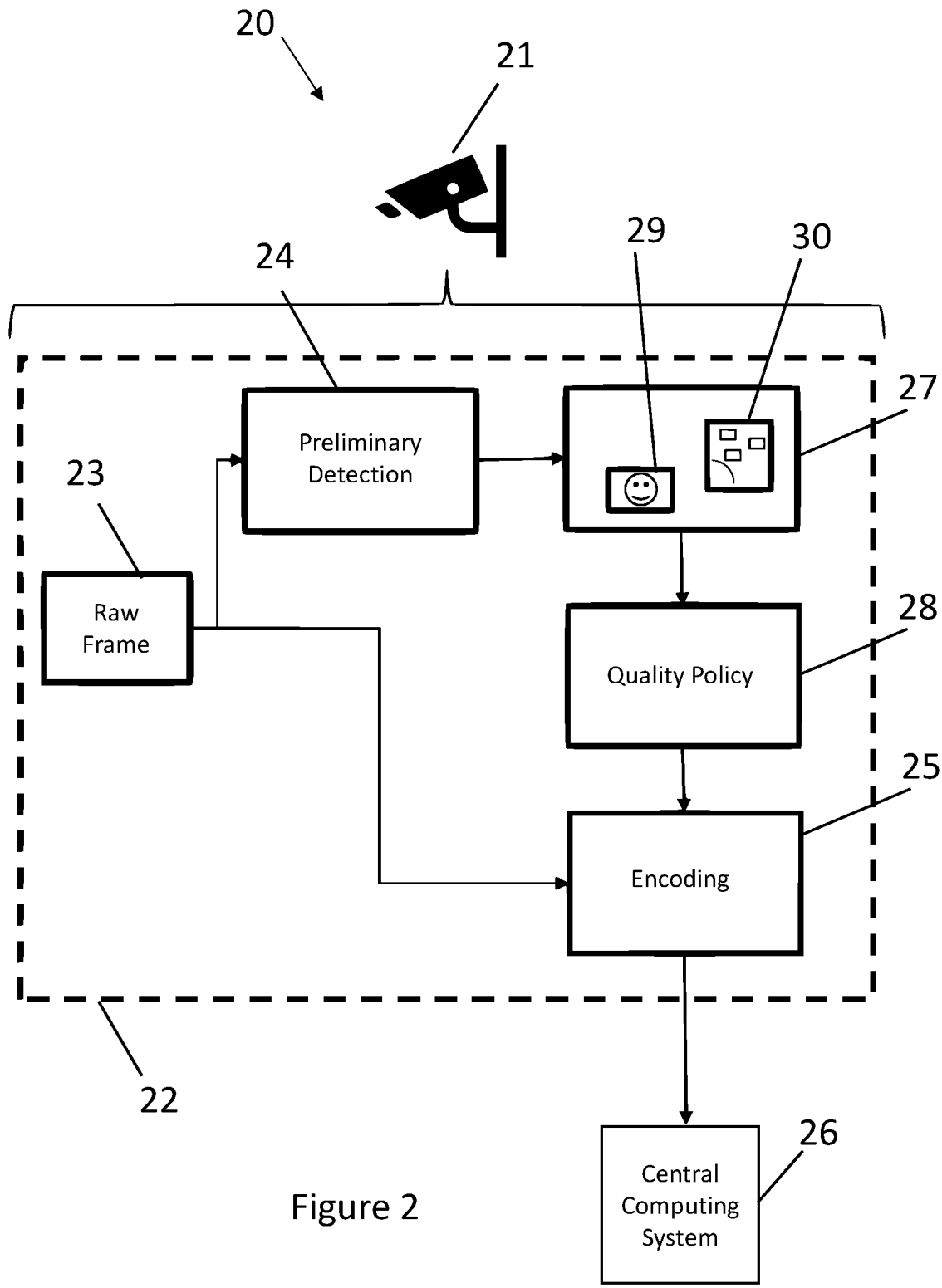
FIG. 2 shows a first example of a security system disclosed herein.
Figure 3:
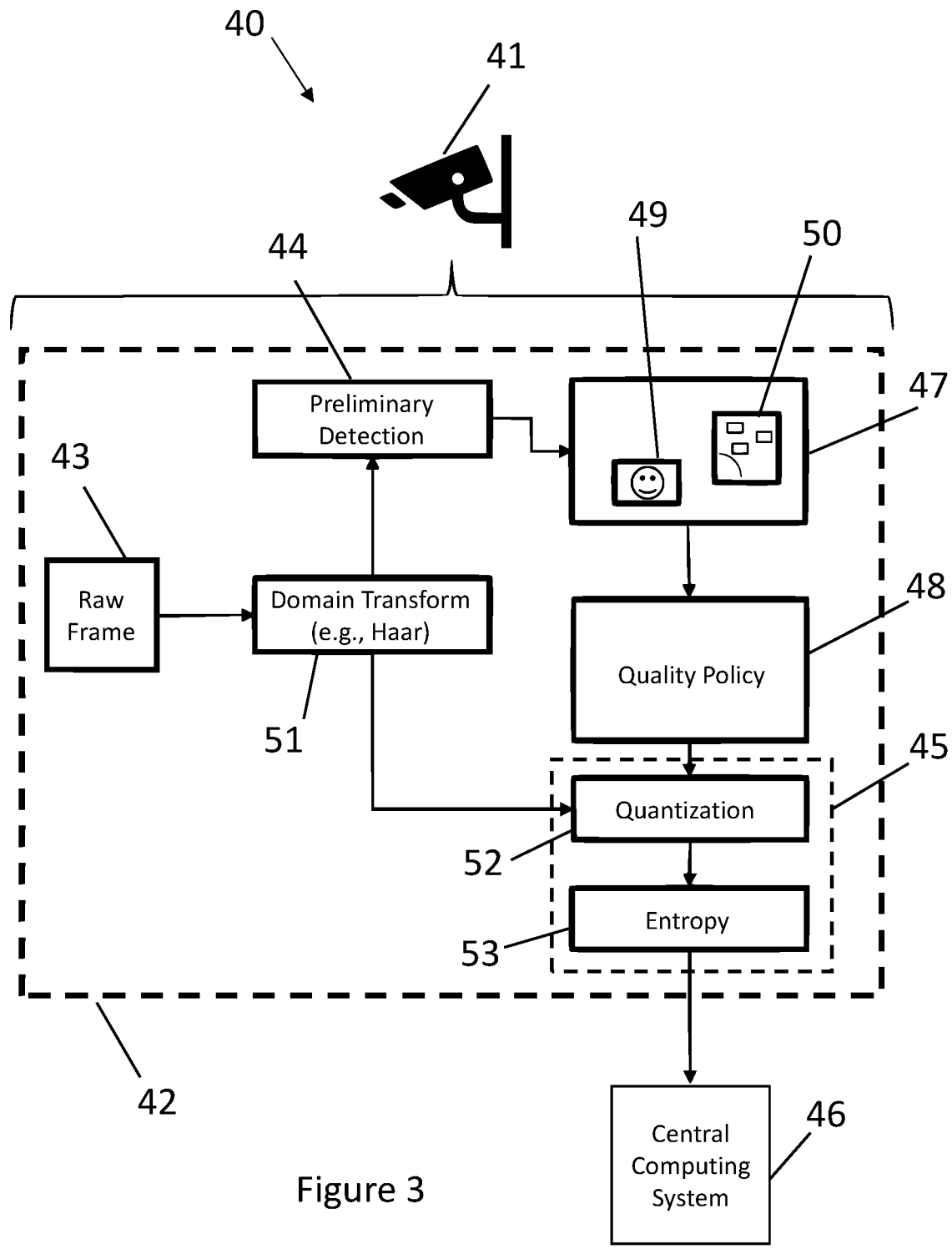
FIG. 3 shows a second example of a security system disclosed herein.

FIG. 3 illustrates, schematically, a security system 40 according to another embodiment. In this case, the security system 40 includes a camera 41, which may be similar to camera 21 of FIG. 2, and a central computing system 46, which may be similar to the central computing system 26 of FIG. 2, as well as an apparatus 42, similar to remote processing apparatus 22 of FIG. 2, which also may form part of the camera 41, or be co-located with it at the remote location. The apparatus 42 includes several modules that perform various functions, which are labelled in FIG. 3 by the function they perform, similarly to the remote processing apparatus 22 of FIG. 2. Thus, there is, firstly, a receiver module 43 for receiving a frame of raw image data from the camera 41, or at least from a source of the image data in the camera 41. However, in this case the frame of raw image data is passed first to a domain transformation module 51. The domain transformation module 51 transforms the raw image data into another domain. In the embodiment of FIG. 2, such a transformation may form the first part of the compression process used to compress the detected portions. However, in this embodiment, this first part of the compression process takes place prior to the preliminary detection so that the preliminary detection operates, not on the raw image data pixels, but on transform coefficients produced by the transformation of the raw image data. The transformation produces transform coefficients, such as Haar coefficients generated by a Haar transform, as is well known in the field of image compression. These transform coefficients are then passed to the preliminary detection module 44, where they are used to detect the portions of the frame of image data 47 that contain possible regions of interest, as in the embodiment of FIG. 2. For example, a portion 49 of the frame of image data 47 is detected as potentially containing a face, whereas portion 50 would not be detected as containing a possible region of interest as it does not contain a face.

The transform coefficients are also passed to the compression module 45, which may in some embodiments include a quantisation part 52 and an entropy part 53. Effectively, therefore, in this embodiment the preliminary detection interrupts the encoding process, performing the preliminary detection after the domain transformation but before quantisation and entropy encoding, which is also well known as part of a compression process. This can simplify the process of detection and therefore may improve performance.

An advantage of performing the preliminary detection in another domain, such as using Haar coefficients from a Haar transformation, is that these coefficients already reflect some local correlations between pixels which can, in turn, be helpful for preliminary detection. In a case where preliminary detection of regions of interest is based on deep learning using machine learning in neural networks the use of the transform coefficients can also potentially reduce complexity of this system by lowering a "depth" of the deep learning so that fewer layers of a neural network need be used and, as a result, benefits can include computation performance gains.

The preliminary detection could alternatively use algorithms, such as Viola-Jones algorithm for object detection, which is itself based on Haar coefficients, so a Haar transformation to this domain can be beneficial from a performance point of view since this domain can be used by both such detection algorithms and Haar based compression processes.

Although the above described example uses the Haar transformation, it will be appreciated that different transformations can be used, including a plurality of transformations. The transformation to be used, or a set of transformations to be used, can be chosen depending on the content of the image data. A factor which can be used to define the content can be based on an output from the transformation itself so that the chosen transformation can be adapted to a different transformation or set of transformations for later frames of image data (in the case of a stream of frames). For example if a Haar transformation is first used (perhaps as a default choice), the output coefficients may be measured and categorised for a particular region depending on their values. A transformation policy algorithm may then decide to switch to a different transformation for the next frame of image data depending on the values of the output coefficients (for example, a DCT transformation may be chosen for a subsequent frame if the output coefficients have a low value). Such dynamic section of the (or several) transformations may be beneficial from the point of view of compression for such content which has slow local changes reflected by small values of Haar coefficients. This may also be determined indirectly by observing zero count and treating it as a parameter to a transformation selection policy (for example, where a high value of zero count indicates less complicated content indicating that it may be better to switch to DCT).

Alternatively, the domain transformation may not be specified directly. The domain transformation may include a neural network (or other machine learning technique), which can be trained to find an appropriate transformation for both the compression and the preliminary detection, and may not be best for either, but may be more appropriately balanced to be used by both.

In another example, the domain transformations may be separated, with one used for the preliminary detection of the regions of interest and another one for compression. In this case, the selection of one domain transformation (or set thereof) for the preliminary detection may improve the quality policy 48, whereas a second transformation (or set thereof) for compression may be better to preserve significant features for computer vision algorithms. Furthermore, different transformation may be chosen for compression of different portions of the image data. For example, for regions of interest it may be assumed that it may be better to use a Haar transformation since it better preserves edges (such as in text) which in turn are significant for computer vision algorithms. For the rest of the content, assuming that these are rather smooth areas, better gains may be obtained with DCT so this transformation compression can be chosen for such remainder portions. It will also be appreciated that different transformations and/or compression processes may be chosen for different regions of interest, especially if an initial transformation provides information regarding a particular region of interest that may benefit from one or another further transformation or compression/encoding process.

The quality policy that indicates the compression process to be used, may not only chose lower or higher quantisation factors, but may also switch quantisation tables prepared specifically for computer vision algorithms depending on the regions of interest. This can be crucial since standard compression algorithms have quantisation tables optimised to HVS e.g. based on just-noticeable difference (JND). This could be necessary to create equivalent of JND for computer vision algorithms. Therefore, it may be beneficial to generate (offline) one or more quantisation tables specifically for dedicated detection or recognition algorithms which would take already compressed and decompressed content (and thus could be executed based on content provided from the camera). The generator/trainer can work by changing quantisation in a given range, use it to encode and decode particular (training) content and feed it to a detection/recognition algorithm. It can then check whether the object(s) where properly detected\recognised and continue to increase quantisation values until the detection\recognition algorithm fails. In this way it can find optimal values of quantisation which will keep compression performance at the optimum level and at the same time preserve sufficient content in the compressed data to allow the computer vision algorithms to work properly.

As mentioned above, the transformation policy algorithm can decide to switch to a different transformation based on many different factors. These may also include bandwidth limitation, content (processing) difficulties, temperature of engines which calculate transformations, or other factors.

Figure 4:
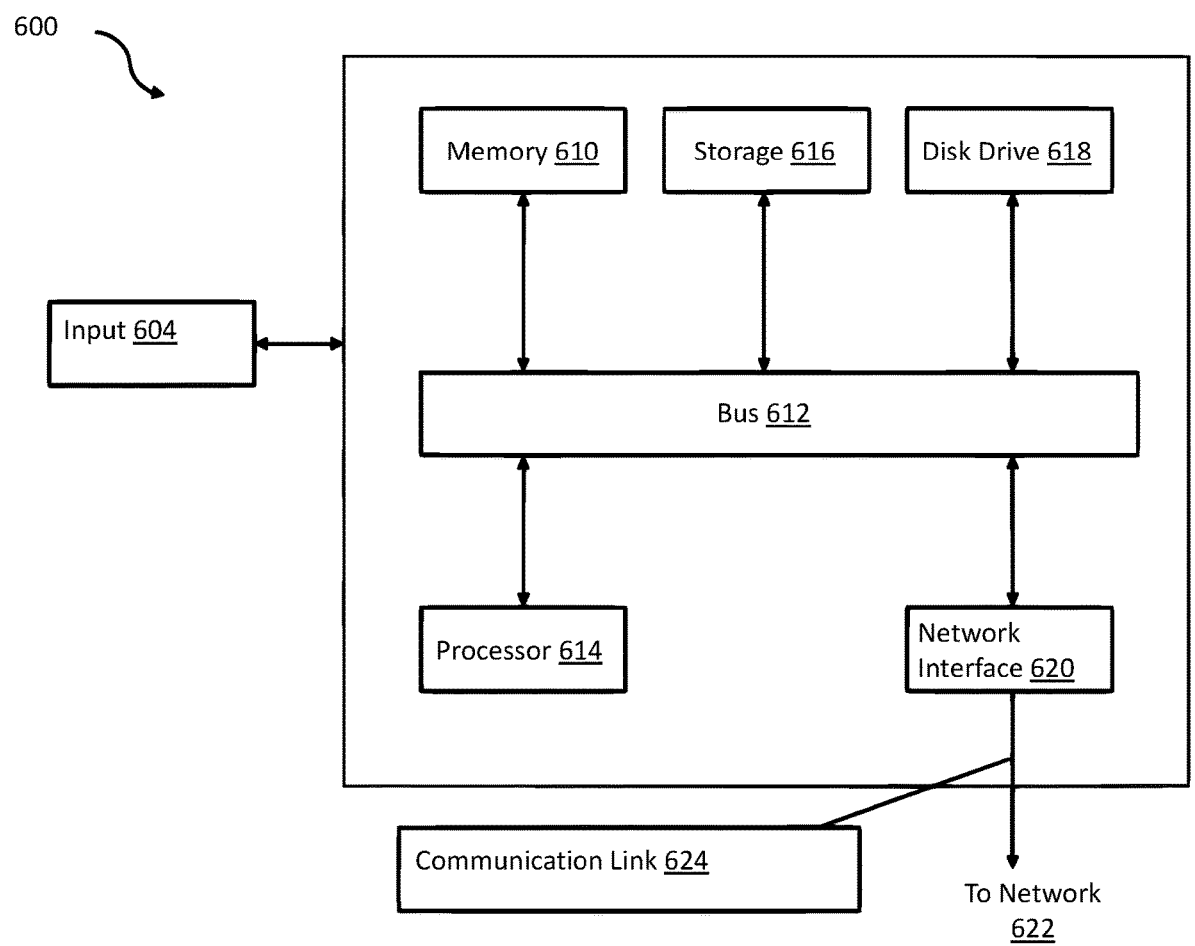
FIG. 4 shows an example of a computer processing system which may be used in the security system of either FIG. 2 or FIG. 3.

FIG. 4 is a block diagram of a computer system 600 suitable for implementing one or more embodiments of the present disclosure, including the remote processing apparatus 22, 42, and/or the central computing system 26, 46. The computer system 600 includes a bus 612 or other communication mechanism for communicating information data, signals, and information between various components of the computer system 600. The components include an input/output (I/O) component 604 that can receive input data, such as the raw image data from the camera, and send a corresponding signal to the bus 612. A transceiver or network interface 620 transmits and receives signals between the computer system 600 and other devices, such as the central computing system, via a network 622. In one embodiment, the transmission is wireless, although other transmission mediums and methods may also be suitable. A processor 614, which can be a micro-controller, digital signal processor (DSP), or other processing component, processes these various signals, such as for transmission to other devices via a communication link 624.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 could be utilised to perform the above described functions of the remote processing apparatus 22, 42, and/or the central computing system 26, 46.

Executable logic for performing any described functions may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium, such as a magnetic or optical disk or other magnetic/optical storage medium, or FLASH or other solid-state memory (e.g. integrated into a device or in the form of a memory card). In one example, transmission media may take the form of acoustic or light waves, such as those generated during radio wave, optical, and infrared data communications.

In various embodiments of the present disclosure, execution of instruction sequences to practice the present disclosure may be performed by the computer system 600. In various other embodiments of the present disclosure, a plurality of computer systems 600 coupled to the network 622 (e.g., such as a LAN, WLAN, PTSN, and/or various other wired or wireless networks, including telecommunications, mobile, and cellular phone networks) may perform instruction sequences to practice the present disclosure in coordination with one another.

The above embodiments and examples are to be understood as illustrative examples. Where applicable, various embodiments provided by the present disclosure may be implemented using hardware, software, middleware, firmware or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. Embodiments may comprise computer program products comprising program instructions to program a processor to perform one or more of the methods described herein, such products may be provided on computer readable storage media or in the form of a computer readable signal for transmission over a network. Embodiments may provide computer readable storage media and computer readable signals carrying data structures, media data files or databases according to any of those described herein. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

Various aspects may be described in the following numbered clauses:

1. A system comprising an apparatus for remote processing of raw image data, the apparatus comprising:
   a non-transitory memory; and
   one or more hardware processors coupled to the non-transitory memory and configured to read instructions from the non-transitory memory to cause the apparatus to perform operations comprising:
   receiving raw image data in a raw form from a source of raw image data;
   detecting one or more portions of the raw image data containing one or more possible regions of interest;
   compressing the raw image data in each of the detected portions at a first compression level to produce compressed detected data;
   treating remainder portions of the raw image data that do not form part of the detected portions either by compressing them at a second compression level different than the first compression level or by discarding them; and
   transmitting at least the compressed detected data to a central computing system.

2. The system of clause 1, wherein the first compression level compresses the raw image data in the respective detected portions in a manner to facilitate further analysis of the image data when it has been decompressed.

3. The system of either clause 1 or clause 2, wherein the operations further comprise:
   selecting a first compression process from a plurality of compression processes to be used for compressing the detected portions, wherein the first compression process is selected so that the compressing the raw image data in each of the detected portions at the first compression level is performed so that the compressed detected data will facilitate further analysis of the image data when the compressed detected data has been decompressed.

4. The system of clause 3, wherein the operations further comprise:
   determining that the remainder portions of the raw image data are to be compressed; and
   selecting a second compression process from the plurality of compression processes to be used to compress the remainder portions of the image data to produce compressed remainder data.

5. The system of any preceding clause, wherein the operations further comprise:
   detecting possible facial regions of interest which appear to be faces, but without performing full facial recognition; and
   compressing the detected possible facial regions of interest using a compression process that maintains as much facial detail as possible, so as to facilitate full facial recognition carried out by the central computing system.

6. The system of any one of clauses 3, 4 or 5, wherein the operations further comprise:
   selecting the first compression process from the plurality of compression processes based on the type of raw image data received from the source or based on the type of image data in the detected portions.

7. A system comprising an apparatus for remote processing of raw image data, the apparatus comprising:
   a non-transitory memory; and
   one or more hardware processors coupled to the non-transitory memory and configured to read instructions from the non-transitory memory to cause the apparatus to perform operations comprising:
   receiving raw image data in a raw form from a source of raw image data;
   performing one or more transformations on the raw image data to produce transformed image data;
   detecting one or more portions of the transformed image data containing one or more possible regions of interest;
   compressing the transformed image data in each of the detected portions at a first compression level to produce compressed detected data;
   treating remainder portions of the transformed image data that do not form part of the detected portions either by compressing them at a second compression level different than the first compression level or by discarding them; and
   transmitting at least the compressed detected data to a central computing system.

8. The system of clause 7, wherein the first compression level compresses the transformed image data in the respective detected portions in a manner to facilitate further analysis of the image data when it has been decompressed.

9. The system of either clause 7 or clause 8, wherein the operations further comprise:
   selecting a first compression process from a plurality of compression processes to be used for compressing the detected portions, wherein the first compression process is selected so that the compressing the transformed image data in each of the detected portions at the first compression level is performed so that the first compressed detected data will facilitate further analysis of the image data when the compressed detected data has been decompressed.

10. The system of clause 9, wherein the operations further comprise:
    determining that the remainder portions of the transformed image data are to be compressed; and
    selecting a second compression process from the plurality of compression processes to be used to compress the remainder portions of the image data to produce compressed remainder data.

11. The system of any one of clauses 7 to 10, wherein the operations further comprise:
    detecting possible facial regions of interest which appear to be faces, but without performing full facial recognition; and
    compressing the detected possible facial regions of interest using a compression process that maintains as much facial detail as possible, so as to facilitate full facial recognition carried out by the central computing system.

12. The system of any one of clauses 9 to 11, wherein the operations further comprise:
    selecting the first compression process from the plurality of compression processes based on the type of raw image data received from the source or based on the type of image data in the detected portions.

13. The system of any one of clauses 9 to 12, wherein the one or more transformations performed on the raw image data is selected from a plurality of transformations based on the type of raw image data received from the source.

14. The system of any preceding clause 7, wherein the one or more transformations performed on the raw image data includes a Haar transformation which generates Haar coefficients when the raw image data is transformed by the Haar transformation, and wherein detecting the one or more portions of the transformed image data containing one or more possible regions of interest uses the Haar coefficients.

15. The system of any one of clauses 1 to 6, further comprising a camera comprising the source of the raw image data.

16. The system of clause 15, further comprising the central computing system, wherein the central computing system comprises:
 a non-transitory memory; and
 one or more hardware processors coupled to the non-transitory memory and configured to read instructions from the non-transitory memory to cause the apparatus to perform operations comprising:
  receiving at least the compressed detected data from the apparatus;
  decompressing at least the compressed detected data; and
  analyzing the one or more possible regions of interest in the decompressed detected data to determine whether they contain any identifiable elements of interest; and
  identifying one or more of the identifiable elements of interest.

17. The system of clause 16, wherein the one or more possible regions of interest are possible facial regions of interest that may contain faces, the identifiable elements of interest are faces and wherein the operations performed by the central computing system further comprise identifying the faces by performing full facial recognition.

18. The system of any one of clauses 7 to 14, further comprising a camera comprising the source of the raw image data.

19. The system of clause 18, further comprising the central computing system, wherein the central computing system comprises:
 a non-transitory memory; and
 one or more hardware processors coupled to the non-transitory memory and configured to read instructions from the non-transitory memory to cause the apparatus to perform operations comprising:
  receiving at least the compressed detected data from the apparatus;
  decompressing at least the compressed detected data; and
  analyzing the one or more possible regions of interest in the decompressed detected data to determine whether they contain any identifiable elements of interest; and
  identifying one or more of the identifiable elements of interest.

20. The system of clause 19, wherein the one or more possible regions of interest are possible facial regions of interest that may contain faces, the identifiable elements of interest are faces and wherein the operations performed by the central computing system further comprise identifying the faces by performing full facial recognition.

The invention claimed is:

1. A system comprising:
 a first non-transitory memory;
 one or more first hardware processors coupled to the first non-transitory memory and configured to read first instructions from the first non-transitory memory to cause the one or more first hardware processors to:
  receive raw image data in a raw form from a source of raw image data;
  perform a first domain transformation, selected from a predetermined set of domain transforms, on the raw image data;
  detect one or more portions of the raw image data containing one or more possible regions of interest based on the domain transformed raw image data;
  select a first compression process from a plurality of predetermined compression processes based at least in part on a data type associated with the raw image data, wherein the data type indicates whether the raw image data represents a frame of video;
  compress the raw image data, in each of the detected portions based on the domain transformed raw image data, at a first compression level using the first compression process to produce compressed detected data; and
  treat remainder portions of the raw image data that do not form part of the detected portions either by compressing the remainder portions at a second compression level different than the first compression level or by discarding the remainder portions; and
 a central computing system configured to identify one or more elements of interest in the compressed detected data.

2. The system of claim 1, wherein compressing the raw image data at the first compression level facilitates further analysis of the compressed detected data when the compressed detected data has been decompressed.

3. The system of claim 1,
 wherein the first compression process is selected so that the compressing of the detected portions at the first compression level facilitates further analysis of the compressed detected data when the compressed detected data has been decompressed.

4. The system of claim 3, wherein execution of the first instructions further causes the one or more first hardware processors to:
 determine that the remainder portions of the raw image data are to be compressed; and
 select a second compression process from the plurality of predetermined compression processes to be used to compress the remainder portions of the raw image data to produce compressed remainder data.

5. The system of claim 1, wherein execution of the first instructions further causes the one or more first hardware processors to:
 detect possible facial regions of interest which appear to be faces, but without performing full facial recognition; and
 compress the detected possible facial regions of interest using a compression process that maintains as much facial detail as possible, so as to facilitate full facial recognition carried out by the central computing system.

6. The system of claim 1, further comprising a camera, wherein the camera includes the source of the raw image data.

7. The system of claim 1, wherein the central computing system comprises:
 a second non-transitory memory; and
 one or more second hardware processors coupled to the second non-transitory memory and configured to read second instructions from the second non-transitory memory to cause the one or more second hardware processors to:

receive at least the compressed detected data from the one or more first hardware processors;

decompress at least the compressed detected data;

analyze the one or more possible regions of interest in the decompressed detected data to determine whether the one or more possible regions of interest contain the one or more elements of interest; and identify at least one of the one or more elements of interest.

8. The system of claim 7, wherein the one or more possible regions of interest are one or more possible facial regions of interest that may contain one or more faces, the one or more elements of interest are one or more faces, and wherein execution of the second instructions further causes the one or more second hardware processors to identify the one or more faces of the one or more elements of interest by performing full facial recognition.

9. The system of claim 1, wherein the performing of the first domain transformation on the raw image data includes performing a Haar transformation to generate Haar coefficients, and wherein the detecting of the one or more portions of the raw image data is based on the Haar coefficients.

10. The system of claim 1, wherein the compressing of the raw image data in each of the detected portions comprises performing a second domain transformation on the raw image data.

11. A method comprising:

receiving raw image data in a raw form from a source of raw image data;

performing a first domain transformation, selected from a predetermined set of domain transforms, on the raw image data;

detecting one or more portions of the raw image data containing one or more possible regions of interest based on the domain transformed raw image data;

selecting a first compression process from a plurality of predetermined compression processes based at least in part on a data type associated with the raw image data, wherein the data type indicates whether the raw image data represents a frame of video;

compressing the raw image data, in each of the detected portions based on the domain transformed raw image data, at a first compression level using the first compression process to produce compressed detected data;

treating remainder portions of the raw image data that do not form part of the detected portions either by compressing the remainder portions at a second compression level different than the first compression level or by discarding the remainder portions; and transmitting at least the compressed detected data to a central computing system configured to identify one or more elements of interest in the compressed detected data.

12. The method of claim 11, wherein compressing the raw image data at the first compression level facilitates further analysis of the compressed detected data when the compressed detected data has been decompressed.

13. The method of claim 11, wherein the first compression process is selected so that the compressing of the detected portions at the first compression level facilitates further analysis of the compressed detected data when the compressed detected data has been decompressed.

14. The method of claim 13, wherein the treating of the remainder portions comprises:

determining that the remainder portions of the raw image data are to be compressed; and selecting a second compression process from the plurality of predetermined compression processes to be used to compress the remainder portions of the raw image data to produce compressed remainder data.

15. The method of claim 11, further comprising:

detecting possible facial regions of interest which appear to be faces, but without performing full facial recognition; and compressing the detected possible facial regions of interest using a compression process that maintains as much facial detail as possible, so as to facilitate full facial recognition carried out by the central computing system.

16. The method of claim 11, wherein a camera includes the source of the raw image data.

17. The method of claim 11, further comprising, at the central computing system:

receiving the at least the compressed detected data;

decompressing the at least the compressed detected data;

analyzing the one or more possible regions of interest in the decompressed detected data to determine whether the one or more possible regions of interest contain the one or more elements of interest; and identifying at least one of the one or more elements of interest.

18. The method of claim 17, wherein the one or more possible regions of interest are one or more possible facial regions of interest that may contain one or more faces, the one or more elements of interest are one or more faces, and wherein the identifying of the at least one of the one or more elements of interest comprises identifying the one or more faces of the one or more elements of interest by performing full facial recognition.

19. The method of claim 11, wherein the performing of the first domain transformation on the raw image data includes performing a Haar transformation to generate Haar coefficients, and wherein the detecting of the one or more portions of the raw image data is based on the Haar coefficients.

20. The method of claim 11, wherein the compressing of the raw image data in each of the detected portions comprises performing a second domain transformation on the raw image data.

* * * * *